(12) United States Patent
Suzuki

(10) Patent No.: US 6,856,766 B2
(45) Date of Patent: Feb. 15, 2005

(54) COMPONENT MATERIAL FOR CONSTRUCTING CASING FOR ELECTRONIC DEVICES

(75) Inventor: Tatsuya Suzuki, Tokyo (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 10/622,904

(22) Filed: Jul. 17, 2003

(65) Prior Publication Data

US 2004/0022036 A1 Feb. 5, 2004

(30) Foreign Application Priority Data

Jul. 31, 2002 (JP) .................................... 2002-223916

(51) Int. Cl.⁷ .............................................. G03B 17/02
(52) U.S. Cl. ................... 396/535; 396/542; 348/374
(58) Field of Search ................... 396/535, 542; 348/373, 374, 376

(56) References Cited

U.S. PATENT DOCUMENTS

| | | | | |
|---|---|---|---|---|
| 2,913,971 A | * | 11/1959 | Berkovits | 396/434 |
| 5,190,791 A | * | 3/1993 | Gunter et al. | 427/554 |
| 5,310,784 A | * | 5/1994 | Ide et al. | 524/876 |
| 6,613,251 B2 | * | 9/2003 | Savel, III | 264/29.7 |
| 6,670,039 B1 | * | 12/2003 | Nagle et al. | 428/408 |

FOREIGN PATENT DOCUMENTS

JP          7-24353 B2      3/1995

* cited by examiner

Primary Examiner—David M. Gray
(74) Attorney, Agent, or Firm—Frishauf, Holtz, Goodman & Chick, P.C.

(57) ABSTRACT

A component material for an electronic's casing comprises wood or woody material that has two surfaces, one of the surfaces of the wood or woody material which is carbonization-treated to provide a carbonized layer on one surface of the casing, and the other surface of the wood or woody material which is not carbonization-treated.

6 Claims, 3 Drawing Sheets

COMPONENT MATERIAL FOR CONSTRUCTING CASING FOR ELECTRONIC DEVICES

CROSS-REFERENCE TO RELATED APPLICATIONS

This application is based upon and claims the benefit of priority from the prior Japanese Patent Application No. 2002-223916, filed Jul. 31, 2002, the entire contents of which are incorporated herein by reference.

BACKGROUND OF THE INVENTION

1. Field of the Invention

The present invention relates to a component material for constructing a casing for various kinds of electronic devices.

2. Description of the Related Art

For a casing for various kinds of electronic devices, such as a camera, a mobile phone, a PDA (Personal Digital Assistant), a personal computer, and so on, use has conventionally been made of materials such as metal (aluminum, stainless steel, titanium and magnesium) or a resin (acrylonitrile-butadiene-styrene (ABS) resin, polycarbonate, acrylic resin). These materials have been adopted not only from the functional consideration such as their moldability, rigidity and corrosion resistance, but also for aesthetics.

Recently, further attention has also been paid to using, as a familiar, and environment-friendly material, wood or a woody material obtained by processed wood. For example, Jpn. Pat. Appln. KOKOKU Publication No. 7-24353 discloses an electromagnetic shielding material obtained through impregnation of wood or woody material with phenol resin and subsequent carbonization. The Publication discloses the idea of, while using the wood material, imparting an electromagnetic shielding property to a product obtained.

BRIEF SUMMARY OF THE INVENTION

According to a first aspect of the present invention, there is provided a component material for an electronic device's casing comprising any one of wood and woody material that has two surfaces; one of the surfaces of the any one of wood and woody material which is carbonization-treated to provide a carbonized layer on one surface; and the other surface of the any one of the wood any woody material which is not carbonization-treated.

According to a second aspect of the present invention there is provided a component material, made of any one of wood and woody material, for an electronic device's casing, comprising a carbonized layer created by a carbonization treatment; and a noncarbonized layer not subjected to the carbonization treatment.

According to a third aspect of the present invention there is provided an electronic device, comprising a substrate configured to have electronic component parts mounted thereon; a chassis configured to have the substrate mounted thereon; and a casing configured to cover the substrate-mounted chassis therewith, wherein the casing is made of any one of wood and woody material that has two surfaces, and one of the surfaces of the any one of wood and woody material is carbonization-treated to provide a carbonized layer on one surface of the casing.

According to a fourth aspect of the present invention, there is provided a method for manufacturing a component material for constructing a casing of an electronic device comprising: choosing one surface of any one of wood and woody material as a surface to be made to one surface of the casing; and subjecting the chosen surface of the any one of wood and woody material to a carbonization treatment.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

One embodiment of the present invention will be explained below with reference to the accompanying drawing.

As a camera of one practical form of electronic device using a component material for constructing a casing for the electronic device according to the one embodiment of the present invention, a digital camera is disclosed in which captured image data is stored in a memory card. The casing of this camera comprises a front cover 10 and a rear cover 12.

Figure 1:
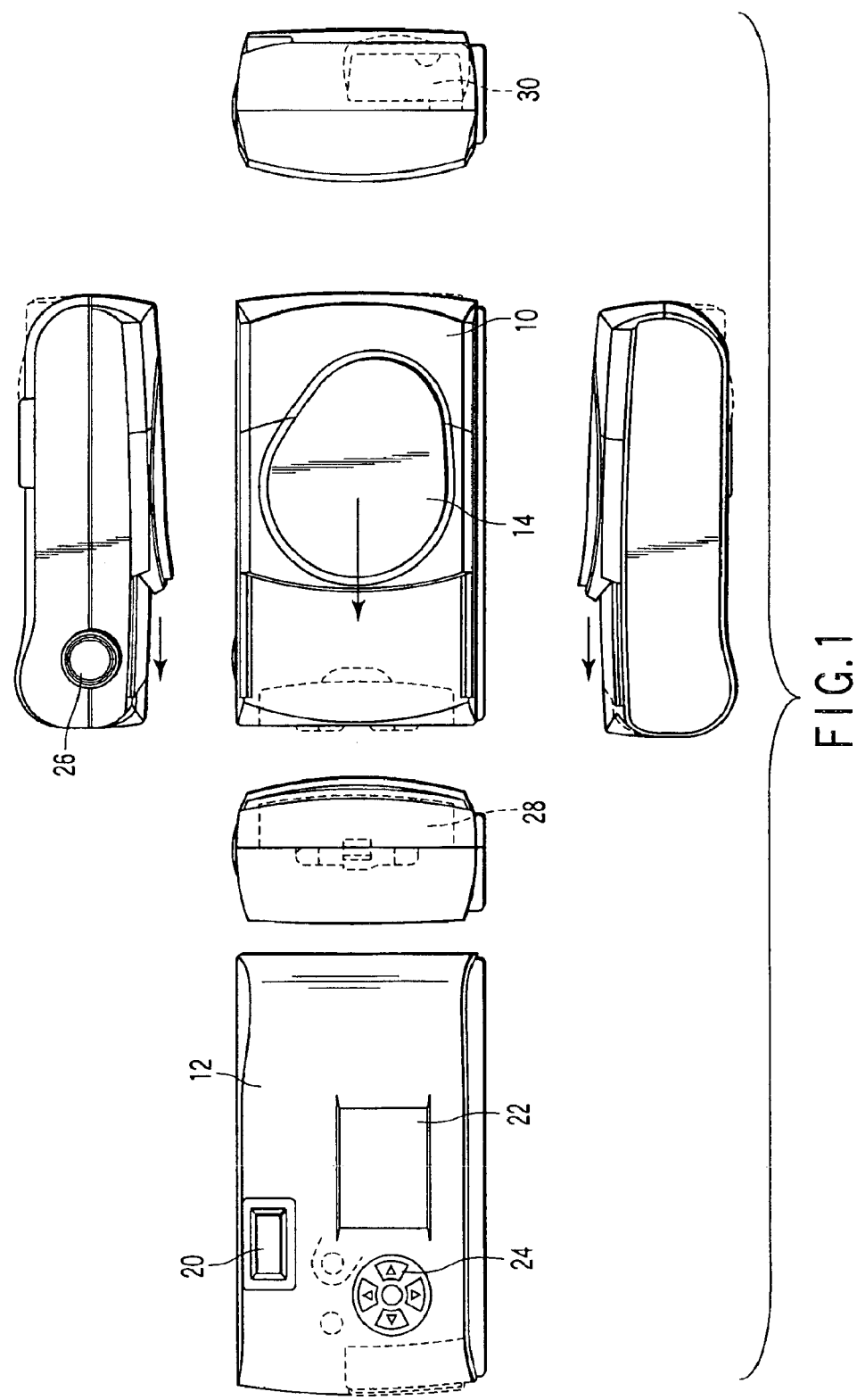
FIG. 1 is a six-side view showing an outer appearance of a camera as one example of an electronic device to which a component material for its casing is applied according to an embodiment of the present invention.
Figure 2:
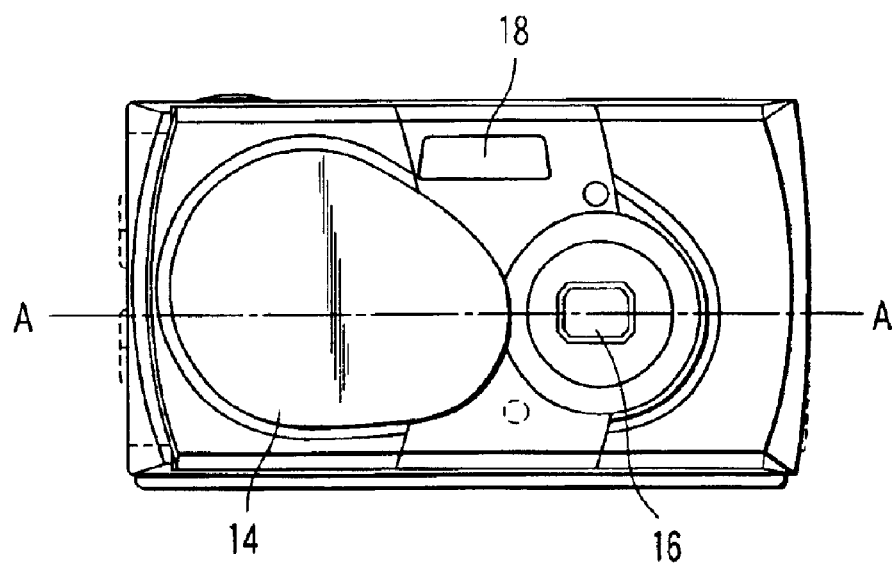
FIG. 2 is a front view showing a camera of FIG. 1 with its lens barrier in an opened state.

A lens barrier 14 is so attached to the front cover 10 as to be slidable relative to the front cover 10. When the lens barrier 14 is slidably moved in an arrow-indicated direction to an open position where a lens 16 and a finder and flash unit window 18 are in an exposed predetermined position as shown in FIG. 2, a mechanical switch, not shown, is turned ON. By turning the mechanical switch ON, a power source of the camera is turned ON to allow the camera to be set in an image capturing state.

Relative to the rear cover, not only the finder 20 but also an image display LCD monitor 22 and 4-way selection button 24 for performing various operations, such as performing switching operations for setting various modes, are arranged.

A release button 26 for an image capturing instruction is provided on a top side of the camera.

A memory card cover 28 and connector cover 30 are openably provided, respectively, on the left surface side and right surface side relative to the front cover 10.

Figure 3:
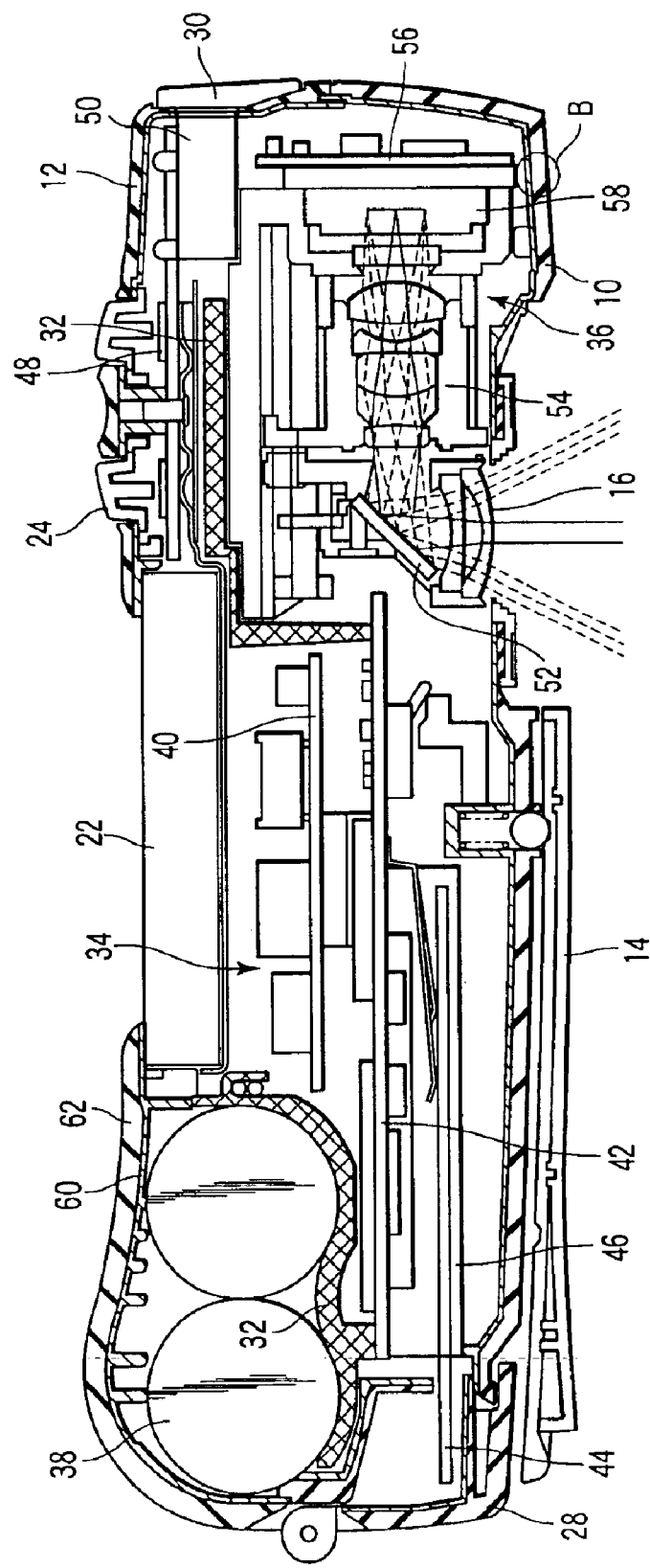
FIG. 3 is a cross-sectional view, taken along A—A in FIG. 2, showing the camera.

FIG. 3 is a cross-sectional view, as taken along line A—A in FIG. 2, showing such a camera (In the Figure, the hatching for indicating the cross-sectional area is omitted for simplification). As shown in the Figure, after a circuit unit 34 and image capturing unit 36 are mounted relative to a chassis 32 (cross-hatched in Figure), these are covered with the front cover 10 and rear cover 12.

The circuit unit 34 above includes a power source substrate 40 connected to a battery unit 38, a main substrate 42 with various kinds of electronic components mounted thereon and operated under a power supply from the power source substrate 40, a memory card slot 46 for receiving a memory card 44, the LCD monitor 22, a tact SW 48 for detecting a push-down of the select button 24, an external jack 50, and so on. Further, the image capturing unit 36 comprises the lens 16, a mirror 52 for bending image capturing light from the lens 16, an image capturing lens group 54 and a CCD 58 on the CCD circuit board 56 connected to the main substrate 42, and so on. The details of these components constituting the circuit unit 34 and image capturing unit 36 are known and are therefore omitted.

Figure 4:
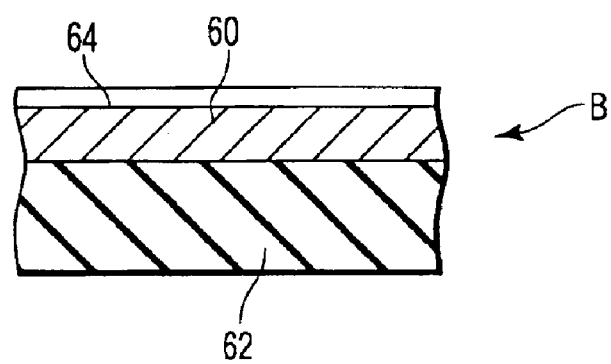
FIG. 4 is a view showing a section B in an enlarged form in FIG. 3.

In the present embodiment, wood is used as the material for the front cover 10 and rear cover 12 constituting the casing of the camera. The wood material itself is not directly used and, as illustrated in FIG. 4 showing an enlarged view of a B section in FIG. 3, has a carbonized surface on one side and a noncarbonized surface on the other side, that is, a wood carbonized layer 60 on one surface and a wood non-carbonized layer 62 on the other surface. Although in FIGS. 3 and 4, the wood material is shown clearly divided into two layers, that is, the wood carbonized layer 60 and wood noncarbonized layer 62, these are indicated only for simplification of the drawing. In reality, the carbonization is progressed to a varying extent and depth. It is needless to say that, though all rib portions are shown as the wood carbonized layer 60, there may exit some noncarbonized portion depending upon its size.

Such one-side carbonization can be realized, for example, by burning at high temperatures. If the burning processing is done by burning one surface only, then a greater dimensional difference is created relative to the other surface. It is desirable to achieve less dimensional difference by, while burning on that surface side, drying that other surface side, for example, under a temperature to an extent that water vapor in the wood is evaporated.

It is known that such dried wood absorbs atmospheric moisture but that it never absorbs moisture to its original level and, at some time point, breathing will start. If such dried wood is used for the casing, since the dried wood absorbs the water vapor even at a high humidity region, it is possible to prevent the inside of the casing from becoming higher in humidity. In recent years in particular, there has been a growing tendency for the product to be manufactured in the regions of Southeast Asia, where the labor costs are lower. Such regions are higher in temperature and humidity. Therefore, there is a risk that the water vapor will penetrate into the casing of an electronic device manufactured in these regions and, when the electronic device is shipped, for example, to a lower temperature region or regions, there occurs shorting in circuits of the device's casing due to the water vapor condensing. It is believed that such problems can be prevented by using the wood material of the present embodiment as a component material of which the casing for the electronic device is made.

Further, wood is an insulating material and, if carbonized, becomes conductive. It is known that, by doing so, it becomes equal to, or greater than, metal in terms of its conductive performance and, in addition, it also becomes an outstandingly lightweight electromagnetic shielding material. The wood carbonized layer 60 having a carbonized one-surface side is well suited as an electromagnetic shielding material for an electric device demanding portability, such as a camera.

In order to ensure better electromagnetic shielding, it is preferable that the wood carbonized layer 60 be formed on substantially the whole surface of one side (inner side) of the casing. It is also better to form a wood carbonized layer only at a portion, in particular, where an electromagnetic wave is emitted. Conversely, the carbonized wood material may be formed on the whole surface, in which case this portion is created with an enhanced degree of carbonization.

Further, the wood noncarbonized layer 62 may be left as it is in some areas, i.e., the carbonization not being performed on the whole surface of one side (inner surface) of the casing. In the electronic device having a portion where, for example, a higher voltage is momentarily applied, as at a flash unit area, it is preferable to form an insulating material at or near such a portion of the device. In this case, such a portion is left uncarbonized.

It is to be noted that, since such a wood carbonized layer 60 is conductive in nature, according to the present embodiment, an insulating/dust-proof layer 64 is formed on the surface of the wood carbonized layer as shown in FIG. 4. Of course, such a insulating/dust-proof layer 64 may be omitted. If such an insulating/dust-proof layer 64 is provided, a portion of the coated layer 64 is not created or is removed. It is needless to say that the wood carbonized layer 60 is connected to a ground line of any substrate in the circuit unit 34 via the noncreated or removed portion.

Further, it is known that charcoal absorbs odor. By forming a camera casing with the use of wood having such a wood carbonized layer 60, the odor produced due to the generation of heat in the electronic component parts in the camera is removed and it is also possible to remove odor clinging to the outer surface of the casing. A more pronounced effect appears when used in combination with a photocatalyst.

Further, according to the present invention, the front cover 10 and rear cover 12 are so constructed that the surface of the wood carbonized layer 60 constitutes the inside surface of the casing. By doing so, the outer surface side of the casing constitutes the wood noncarbonated layer 62 where a surface pattern or grain appears on the wood noncarbonated layer 62. This provides not only a better-looking appearance but also an aesthetic outer appearance from a standpoint of a design consideration. As explained in connection with the prior art, for example, Jpn. Pat. Appln. KOKOKU Publication No. 7-24353 discloses an electromagnetic shielding material all carbonized or with the surface of the wood carbonized layer 60 set on the outer surface side of the casing. In this case, a whole surface of the casing becomes a solid black color. This means that, for any kind of wood used for the casing, it all becomes the same solid black color upon being carbonized. If, on the other hand, the outer surface side is placed with the wood noncarbonized layer 62 set as in the present embodiment, it is possible to provide a wood pattern and texture to the casing. That is, there are various kinds of wood used and their own material colors are various such as whitish, reddish, or others. Thus, by selecting the kind of wood used, it is possible to get more color variation. Further, wood has a varying grain pattern, thus even if the product (casing) is of the same kind or color, the surface design/pattern can differ from product to product, thus providing an outstanding effect.

As the wood, for example, there are Japanese cypress, paulownia, teak, mahogany, Japanese cedar, keyaki, pine, cherry tree, etc. Of course, the present invention is not restricted to these.

It is to be noted that, although one surface of the wood has been explained as being carbonized, the other surface side can be partly carbonized to an extent not substantially damaging the grain pattern. For example, a logo mark, etc., of a product name, company name, etc., may be etched by a laser beam on the outer surface of the casing.

Further, since the surface of the wood can be made smoother by being carbonized, this is done so, for example, at the sliding portion of the front cover 10 of the lens barrier 14 or, by carbonizing a corresponding surface of the front cover 10, it is possible to enhance the slide motion of the lens barrier 14. The screw hole, etc., for allowing one surface side of the wood material to communicate with a mating other side surface may also be carbonized to provide a better slide motion on the sidewall surface of the hole. Forming the wood carbonized layer 60 from that one surface side around to that other surface side, intentionally or unintentionally, in such a way does not restrict the present invention.

Although the present invention has been explained based on one embodiment of the present invention, the present invention is not restricted to the above-mentioned embodiment and various changes and modifications of the present invention can be made within the scope of the essence of the present invention.

Although the present embodiment has been explained by taking a camera as the electronic device by way of example, the present invention is not restricted to the component material of which the casing of the present invention is made. The present invention can be applied to various kinds of electronic devices. In particular, the present invention can be preferably applied to a mobile phone, etc., demanding an electromagnetic shielding characteristic.

Use can be made of, in addition to wood, a woody material such as a compression-molded material, with the use of a scrap wood chips, saw dust, etc. It is also possible to utilize bamboo, cane, etc.

Further, the casing of the present embodiment may be comprised of a few parts, such as a front cover 10 and rear cover 12 or one whole wood or woody body material. In either case, the wood or woody material is desirably worked or molded to a desired shape and then carbonized.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A component material for a casing of an electronic device, said component material comprising:

one of a wood and a woody material having two surfaces;

wherein one of the surfaces is carbonization-treated to provide a carbonized layer on an inner surface of the casing; and wherein the other surface is not carbonization-treated.

2. The component material according to claim 1, wherein the carbonized layer is formed on substantially an entirety of the inner surface of the casing.

3. A component material, made of one of a wood and a woody material, for a casing of an electronic device, said component material comprising:

a carbonized layer created by a carbonization treatment so as to constitute an inner-side surface of the casing; and a noncarbonized layer which is not subjected to a carbonization treatment.

4. An electronic device comprising:

a substrate which is adapted to have electronic component parts mounted thereon;

a chassis which is adapted to have the substrate mounted thereon; and a casing which is adapted to cover the substrate-mounted chassis;

wherein the casing comprises one of a wood and a woody material having two surfaces, and one of the surfaces is carbonization-treated to provide a carbonized layer on an inner surface of the casing.

5. A method for manufacturing a component material for constructing a casing of an electronic device, said method comprising:

choosing one surface of one of a wood and a woody material as a surface to be made to be an inner surface of the casing; and subjecting the chosen surface to a carbonization treatment.

6. A casing for an electronic device, said casing comprising:

one of a wood and a woody material having two surfaces;

wherein one of the surfaces is carbonization-treated to provide a carbonized layer on an inner surface of the casing; and wherein the other surface is not carbonization-treated.

* * * * *